United States Patent Office 3,440,882
Patented Apr. 29, 1969

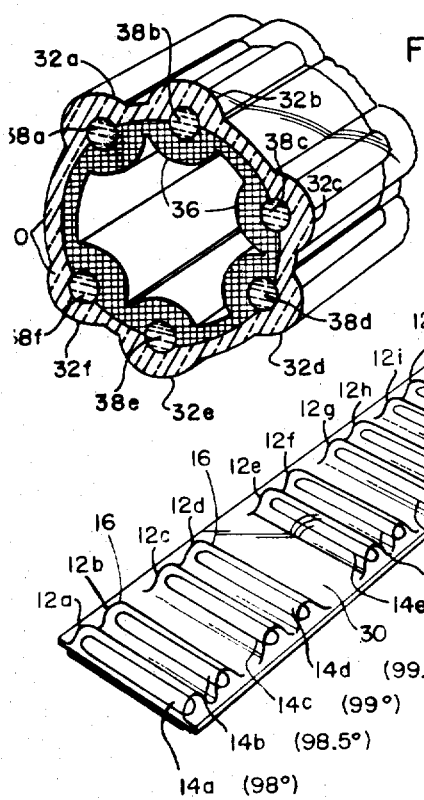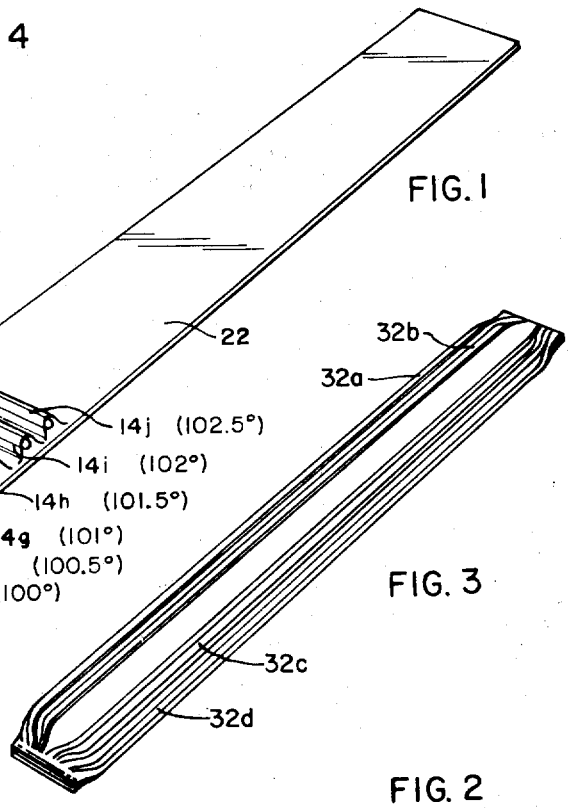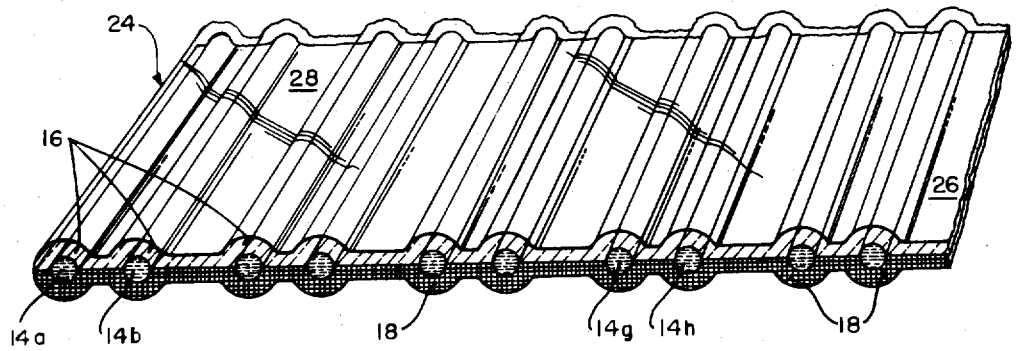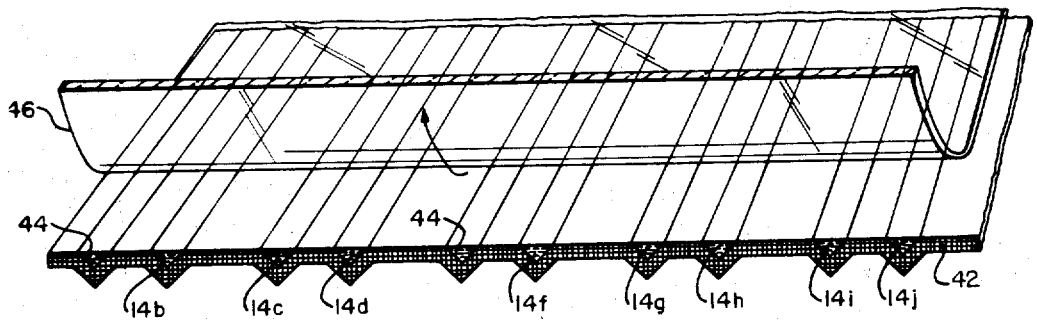

3,440,882
THERMOMETER
William J. Jones, Pittsburgh, Pa., assignor to Westinghouse Electric Corporation, Pittsburgh, Pa., a corporation of Pennsylvania
Filed Sept. 9, 1966, Ser. No. 578,347
Int. Cl. G01k 11/12
U.S. Cl. 73—356                                    7 Claims

ABSTRACT OF THE DISCLOSURE

A clinical thermometer composed of thermoplastic material having a number of parallel-arranged extruded cells filled with temperature responsive materials such as liquid crystalline compounds. In one form the thermometer is a flat tab with the extruded sensor cells extending transversely and heat sealed at side edges of the tab. In another form the thermometer is a cylinder with the extruded sensor cells extending longitudinally and heat sealed at end edges of the cylinder.

---

Clinical thermometers of the usual type, employing mercury or alcohol-filled glass stems with numerals and graduations marked thereon, are relatively expensive, bothersome to maintain in sterile condition, relatively slow-acting, somewhat difficult to read and potentially somewhat hazardous in view of their rigidity and breakability.

In view of the foregoing remarks, it is a prime object of the present invention to provide an improved clinical thermometer which is relatively inexpensive, fast-acting, simple to read, unbreakable, as well as otherwise harmless, and thereby particularly suited for throw-away use.

Other objects, features, and advantages of the invention will become apparent from the following detailed description when taken in connection with the accompanying drawings, in which:

FIGURE 1 is a three-dimensional view of one embodimet of the present invention;

FIG. 2 is a three-dimensional view of an assemblage involved in an exemplified method of fabrication of the thermometer of FIG. 1;

FIG. 3 is a three-dimensional view of an alternate embodiment of the present invention;

FIG. 4 is a three-dinemsional view of a portion of an assemblage involved in an exemplified method of fabrication of the FIG. 3 embodiment of the invention; and FIG. 5 is a three-dimensional view of an assemblage illustrative of an alternate technique for fabrication of thermometers of the present invention.

Referring to FIG. 1, the embodiment of the invention shown therein comprises a plurality of hollow, substantially-cylindrical sensor cells, ten such cells being illustrated and numbered 12a to 12j, containing temperature responsive liquid compositions 14a to 14j, such as hysteretic cholesteric liquid crystalline compositions of the type such as set forth, for example, in copending U.S. patent application Ser. No. 557,060, filed June 13, 1966 and assigned to the assignee of the present patent application. These compositions exhibit a certain color, green, for example, when initially in a cholesteric phase below a precise threshold temperature, turn colorless upon reaching such temperature and increasing thereabove, and retain such colorless condition for a significant interval of time following return to and below such threshold temperature. By controlling the formulation of such compositions 14a to 14j, precise different threshold temperatures can be obtained for the several sensor cells 12a to 12j. For example, cells 12a to 12j can be made responsive to body temperatures ranging from 98° F. to 102.5° F. in steps of ½°. This spans a range from subnormal body temperature to fever temperatures. The sensor cells 12a to 12j when containing such liquid crystal compositions and disposed within a patient's mouth are fast-acting and susceptible to threshold-temperature-response within ten seconds.

As is apparent from the showing in FIG. 1, the several different prime-temperature responsive cells 12a, 12c, 12e, 12g and 12j are arranged in groups of two with their ½° complements and are spaced apart in such groups to afford ready identification and differentiation of those temperature sensor cells which have responded to their threshold temperatures from those cells which have not so responded. In the chosen example, those sensor cells 12a to 12j which have not been subjected to their threshold temperatures will retain their initial color, green, for example, while those sensor cells which have been subjected to their threshold temperatures will have changed to the colorless state.

In the case of use of such liquid crystal compositions, the initial color is enhanced by a dark background, such as black, for example, so that in their non-responsive condition the sensor cells 12a to 12j will exhibit their initial color condition, while in their threshold-temperature-responsive condition in which the liquid crystal composition turns clear, such sensor cells will appear black, in accord with the black background as is observed through the then-clear liquid crystal composition filling such cells.

In accord with the FIG. 1 construction and as is apparent also from FIG. 2, the sensor cells 12a to 12f each comprises an elongated transparent rounded upper wall 16 through which the color state of the liquid crystalline composition within such cells may be observed; such rounded walls serving to magnify the appearance of such compositions, as well as to provide separating indentations on the surface of the thermometer which can be recognized visibly in assist to distinguishing the several cells, one from the other, and thus facilitate counting of the number of cells from one end of the thermometer which have experienced threshold-temperature-response.

Also in accord with use of such liquid crystal compositions, each of the sensor cells 12a to 12j will have a dark or black pigmented layer or background therebeneath. In behalf of economy in manufacture of fabrication such dark background may be furnished by dispersal of pigmentation throughout the thickness of the bottom wall 18 of each cylindrical sensor cell as shown, or sprayed on as a coating on such wall.

The thermometer configuration in the embodiment of FIG. 1 is tab-like, with the array of sensor cells 12a to 12j arranged at one end of an elongated support means in the form of a thin rectangular tab 22. The overall dimensions of such tab-like thermometer may be, for example, a quarter of an inch wide and about two inches long; with the array of ten sensor cells extending about three quarters of an inch along one end of the tab 22, which is relatively small, relatively conservative in material, and readily insertable in the patient's mouth.

In behalf of economy of fabrication, the walls of the sensor cells 12a to 12j can be formed integrally with the tab 22 of a suitable thermoplastic material, such as an ionomer resin, by extrusion. Referring to FIG. 2, the tab 22 and the walls 16 and 18 of the cells 12a to 12j can be formed integrally by extrusion and filled with the liquid crystal compositions to form a continuous sheet 24 having a handle part 26 and a sensor cell part 28. Subsequent to such formation of the sheet 24, such sheets may be subjected to indentations (not shown) by a heated roller, or other suitable joining means, transversely of the direction of extension of the continuous liquid-crystalline-composition-containing convolutions or cylinder parts to obtain sealing of the ends of such cylinders to form the discrete sensor cells, simultaneously with or following which the sheet is separated along such indentations to obtain individual thermometers. In the use of liquid crystalline compositions according to the present state of the art and formulation of such compositions where the cell sealing is obtained by application of heat, a thermoplastic material needs to be chosen which will soften sufficiently to obtain such heat sealing and fusion between layers at temperatures which will not alter or destroy the temperature responsive properties of such compositions.

In accord with a preferred feature of the invention, the material of which the thermometer is composed should be somewhat nonrigid, or flexible, in order to enjoy the advantage of such thermometer being unbreakable.

The number of sensor cells 12 which the thermometer may employ is somewhat arbitrary. For example, perhaps only two or three response temperatures may be desired to merely give indication of above, normal, and/or below normal body temperatures, or even a single response temperature to indicate an above normal condition, following which more precise information as to the specific body temperature could be obtained by use of an auxiliary thermometer of the conventional type. In this latter case, use and interpretation of such a thermometer is simplified, and will satisfy the majority of hospital needs. Further investigation of the patient's temperature need be made only when abnormal.

In the case of the thermometer construction in FIG. 1, it may be advantageous in behalf of rapid discernment of excessive temperatures to provide a larger gap between certain groups of senor cells such as represented by the large gap 30 in FIG. 1 between the sensor cells 12d and 12e.

An alternate construction of a thermometer in accord with the invention is shown in FIGS. 3 and 4 in which the sensor cells are formed integral with the support means in circumferentially-spaced-apart array and extend for the full length of the thermometer. Such a thermometer may be constructed also of thermoplastic material and pinched down at its opposite ends, as shown, by a heat seal technique to obtain closure of opposite ends of the sensor cells to retain the temperature responsive liquid compositions contained therein. In the configuration shown in FIGS. 3 and 4, six temperature cells, 32a to 32f respond to respective body temperatures of 98° F. to 103° F., for example. Circumferential spacing between the cells can be employed to readily identify and distinguish between such cells and between groups of such cells.

Referring to FIG. 4, the cylindrical configuration also can be fabricated by extrusion to provide a black inner layer 36 for dark-background-color-enhancement of liquid crystalline compositions 38a to 38f between inner layer 36 and an outer clear layer 40 which is rounded in the region of the sensor cells for magnification of appearance of the liquid crystalline compositions thereunder as well as for distinguishment of the sensor cells from each other. The FIG. 3 configuration is one which would accommodate oral as well as rectal use, but would tend to be somewhat more difficult to read than the tab-like configuration of FIG. 1.

Referring to FIG. 5, a third concept of fabrication of tab-like thermometers somewhat similar to that of FIG. 1 can be arrived at by provision of a dark-pigmented bottom sheet 42 having a plurality of parallel-arranged troughs 44 formed in an upper surface thereof which could be filled with the liquid crystalline materials 14a to 14f and covered for containment by a transparent upper sheet 46 of clear plastic material bonded to such bottom sheet. Following this, the sandwich assemblage of sheets could be indented and sealed along lines transverse to the direction of extension of the troughs to form discrete sensor cells similar to those of the FIG. 1 thermometer and severance of the thermometers along the lines of seal indentations. Thermometers constructed in accord with the FIG. 5 concept as shown therein would not embody the magnification lens concept of the cylindrical sensor cell form of FIG. 1. However, the top flat layer can be pigmented and the bottom grooved layer can be made clear and provided with the necessary curvature beneath such grooves to afford the magnification feature of claim 1.

Where the temperature responsive liquid composition employed for the sensor cells of the thermometer of the present invention are hysteretic chlorestic liquid crystalline compositions, the desired threshold temperatures can be obtained by those versed in the art of formulating such compositions with a relatively high degree of accuracy, such, for example as within a tenth of a degree Fahrenheit. By way of example, a threshold temperature of 98° F. can be obtained by a composition including 26% cholesterol chloride, 73% cholesterol oleyl carbonate and 1% triolein, and a threshold temperature such as 101° F. might be obtained by a composition including 26% cholesterol chloride and 74% cholesterol erucyl carbonate. The rate of response of these materials to increase in temperature to their threshold values can be a matter of several seconds, as compared to three minutes for the usual prior art clinical thermometers. Once having experienced a color change upon temperature increase, these materials retain their color-altered state for a sufficient period of time, for at least a matter of minutes, upon return to subbody temperature, thus affording ample time for reading the thermometer without erasure by the room temperature conditions to which the thermometer becomes exposed after removal from the patient.

Having now described the invention, I claim:

1. An elongated thermometer of substantially uniform widthwise span throughout its length, comprising an extruded support means of thermoplastic material, a plurality of extruded elongated sensor cells of thermoplastic material integrally joined to said support means and heat sealed at their ends in coincidence with edges of such thermometer, and temperature responsive materials disposed in said sensor cells having a first visibly-detectable state when below respective threshold temperatures and being responsive to increase to such threshold temperatures, respectively, to change to a second visibly-detectable state.

2. The thermometer of claim 1, wherein said sensor cells comprise respective rounded portions of clear plastic material in at least viewing exposure to said temperature responsive materials to magnify the appearance thereof to an observer.

3. The thermometer of claim 1, wherein said temperature responsive materials are hysteretic cholesteric liquid crystalline compositions and the first visibly-detectable state thereof is evidenced by a color and the second such state is evidenced by absence of such color.

4. The thermometer of claim 1, wherein said sensor cells have a rounded clear layer for visibility and magnification of said temperature responsive materials within, and a pigmented layer as background means for enhancement of the appearance of said materials.

5. The thermometer of claim 1, wherein such thermometer is substantially in the form of a thin flat tab, and said sensor cells extend transversely of said tab in mutually parallel relationship one with the other with their heat sealed ends in coincidence with thermometer side edges.

6. A thermometer comprising a number of sensor cells containing temperature-responsive materials having a first visibly-detectable state when below respective threshold temperatures and being responsive to increase to such threshold temperatures, respectively, to change to a second visibly-detectable state, and elongated support means having an end portion on which at least a portion of each of said sensor cells are disposed in spaced-apart orderly array in sequential order according to their threshold temperatures, said sensor cells extending longitudinally of said support means and being disposed in circumferential array.

7. The thermometer of claim 6, wherein said sensor cells comprise cylindrical walls of thermoplastic material extending the full length of said support means, and are heat sealed at their ends in integral attachment with end edges of said support means.

References Cited

UNITED STATES PATENTS

| 1,623,666 | 4/1927 | Ferkel | 73—356 |
| 3,002,385 | 10/1961 | Wahl et al. | 73—356 |
| 3,175,401 | 3/1965 | Geldmacher | 73—356 X |

LOUIS R. PRINCE, *Primary Examiner.*

JOSEPH W. ROSKOS, *Assistant Examiner.*

U.S. Cl. X.R.

116—114.5